Feb. 3, 1959 C. E. LENZ 2,872,571

WAVE FORMING CIRCUIT

Filed Aug. 24, 1953

Inventor:
Charles E. Lenz,
by Charles M. Hutchins
His Attorney.

2,872,571

WAVE FORMING CIRCUIT

Charles E. Lenz, Omaha, Nebr., assignor to General Electric Company, a corporation of New York Application August 24, 1953, Serial No. 376,192

5 Claims. (Cl. 250—27)

This invention relates to electrical wave-forming circuits, and particularly to the type involving integration of an applied wave form to derive a desired shape of output wave.

Oftentimes, electrical waves of a given shape are generated directly by a single source. However, it is possible in certain instances to resort to differentiation or integration of more simple or easily obtainable wave forms to derive output waves of a desired, different shape.

An integrating circuit finding wide use in the electrical field, is the so-called Miller integrator circuit, which comprises a multigrid electron discharge device. This circuit has the desirable characteristics of performing integration to a degree of accuracy not easily attainable by other circuit arrangements, while also being capable of being easily modified to accommodate a wide range of input signal conditions. However, difficulties arise in the use of this circuit when the electrical signals to be formed exhibit a sharp recovery inflection in their wave form, such as in the case of a triangular wave. Undesirable operation of the integrating circuit over this recovery period results in an output signal of undefined and distorted form. Any attempt to use such a signal for triggering or control purposes would be impractical since the resultant jitter or distortion, occurring during the recovery period, would cause unreliable operation of succeeding stages.

Accordingly, it is an object of this invention to provide a novel electrical wave-forming system.

Another object of this invention is to provide a useful integrator circuit.

Another object of this invention is to provide an arrangement permitting accelerated recovery of an integrator circuit during a sharp inflection period of an applied wave-form.

Another object of this invention is to increase the usefulness of a Miller integrator circuit by enabling it to recover more completely.

Another object of this invention is to provide a generator of electrical waves having a parabolic form.

Another object of this invention is to derive output waves exhibiting a well-defined inflection in their waveforms by a modified system of integration.

In accordance with one embodiment of my invention, an arrangement is provided for deriving waves of parabolic form by a process of integration. A particular application of these parabolic waves would be to provide conventional gain control of a radar receiver as a parabolic function variable with time. In accordance with the invention, the waves of parabolic form are derived by twice integrating the square wave output of a multivibrator in a modified form of Miller integrator circuit. To achieve a proper output waveform over the inflection periods of the input waves to the integrator circuit, a parallel circuit arrangement of an inductance and unilateral conducting device are employed to accelerate the recovery of the integrator circuit during the inflection periods.

The features of the present invention, which are believed to be novel, are set forth with particularity in the appended claims. The present invention itself, both as to its organization and advantages thereof, may best be understood by references to the following description when read in connection with the accompanying drawings wherein:

Figure 1:
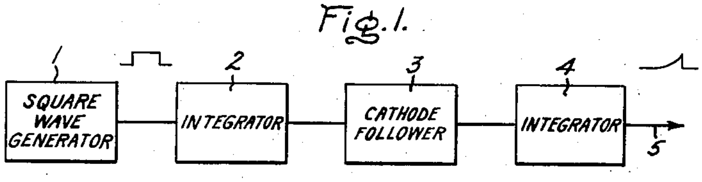
Fig. 1 illustrates in block-diagram form an arrangement for deriving electrical waves of parabolic form.
Figure 2:
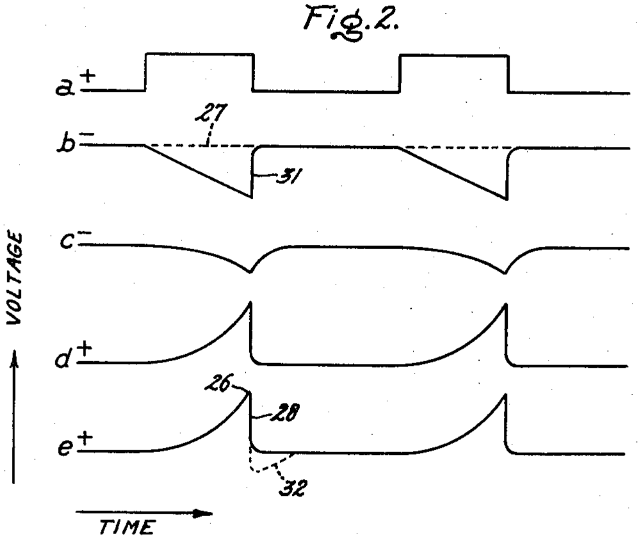
Fig. 2 is a group of wave forms useful in explaining the invention, and particularly the embodiment shown in Fig. 1.

Reference is now made to Fig. 1, showing an arrangement for deriving waves, of the parabolic form illustrated in Fig. 2*e*, by successive integrations of a square wave. The square waves are made available from a source 1. This source may comprise a conventional multivibrator circuit adapted to generate positive-going waves of the periodicity and duration shown in Fig. 2*a*. These positive-going square waves are applied to integrator 2, where they are separately integrated, in a manner to be described shortly, to yield at its output the negative-going triangular waves of Fig. 2*b*. These negative-going triangular waves are applied through cathode follower 3, without phase reversal, to integrator 4 such that upon integration the desired parabolic waves of Fig. 2*e*, shown in solid form, are obtained on the output lead 5. The cathode follower 3 acts as a buffer stage to prevent undesirable interference between the operations of integrators 2 and 4.

Figure 3:
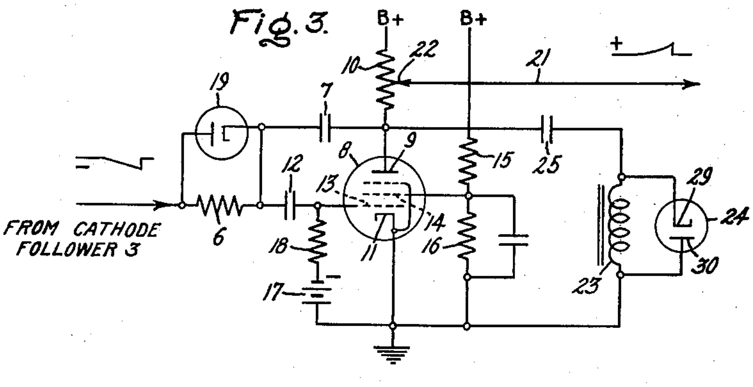
Fig. 3 is a detailed circuit diagram of the integrator circuit used in the arrangement of Fig. 1.

Referring to Fig. 3, there is shown a Miller integrator circuit which has been modified in accordance with an embodiment of the invention, to carry out the successive separate integrations required of blocks 2 and 4 of Fig. 1. Since integrators 2 and 4 are similar, the operation of the modified integrator circuit will be explained in terms of the integration process carried out by integrator 4 of Fig. 1. It should be recognized, however, that the same circuit is employed for integrator 2 and carries out integration of the applied square waves in a similar manner.

Briefly, the Miller integrator involves the fundamental, electrical, integrating circuit comprising a resistor and series condenser. It is well known that in order for this fundamental circuit to integrate properly, the time constant, that is, the product of resistance and capacitance of such a circuit, must be considerably greater than the duration of the waveform to be integrated. By increasing the time constant of a fundamental resistance-capacitance integrating circuit relative to the input-wave duration, it is possible to improve the quality of integration. It can be shown that a portion of the input capacitance associated with a pentode circuit is proportional to the product of the gain of the pentode and its plate-to-grid capacitance. Thus it is possible to increase the accuracy of a basic series resistance-capacitance integrating circuit several hundred times, without introducing excessive attenuation of the output voltage, by replacing the capacitance by the input capacitance of a pentode amplifier having the integrating capacitor connected in its grid-to-plate circuit. This in essence is what the Miller integrator accomplishes. For a further detailed explanation of the theory of operation of a Miller integrator, reference may be made to Britton Chance et al., editors, Waveforms, New York, McGraw-Hill Book Company, Incorporated, 1949.

In the arrangement of Fig. 3, the resistance and capacitance of the fundamental integrating circuit may be assume to be 6 and 7 respectively. The increase in time constant of the fundamental circuit is obtained by use of a pentode 8 having its anode 9 connected to B+ through the load resistor 10, and its cathode 11 connected directly to ground. The condenser 7 is connected from the anode 9 through the direct-current blocking condenser 12 to the control grid 13, whereas the resistor 6 is connected in series with blocking condenser 12 between the source of triangular input waves 3, not shown, and the grid 13. The screen grid 14 is connected to an intermediate point of resistors 15 and 16, connected between B+ and ground, and acting as a voltage divider. The negative, unidirectional voltage source 17, connected in series with resistor 18 between grid 13 and ground serves to establish the operating bias for pentode 8. Diode 19, normally non-conductive, acts to facilitate proper operation of the integrating circuit during the wave forming process as will be described shortly, and has its anode-cathode path connected across resistor 6. The integrated output is developed on lead 21 connected by movable tap 22 to the anode load resistor 10. To accelerate recovery, or clearance of the integrating circuit at the completion of an integration cycle, and corresponding to an inflection point of the applied waves, a circuit comprising inductance 23 and diode 24 is provided. Diode 24 has its anode-cathode path connected across inductance 23, which in turn is connected directly to ground and through coupling condenser 25 to anode 9.

The manner in which the arrangement of Fig. 3 integrates the negative-going triangular wave of Fig. 2*b* to yield the desired parabolic wave of Fig. 2*e* will now be explained. The negative-going triangular wave when applied over resistor 6 and condenser 12 to grid 13 causes the voltage at the anode 9 to rise from its normal value. This increase in voltage at anode 9 causes condenser 7 to charge through the path defined by resistor 10, B+, ground, source 17, resistor 18 and condenser 12, and the path defined by resistor 10, B+, ground, the output circuit of cathode follower 3 and resistor 6. The voltage developed across condenser 7 during the negative-going portion of the applied triangular wave is as shown in Fig. 2*d*. It should be noted that the charging of condenser 7 causes the voltage at grid 13 to be modified and appear as shown in Fig. 2*c*. A comparison of the voltage waveforms **2*b* and 2*e* shows that the anode of diode 19 is negative with respect to its cathode during the leading edge portion of triangular wave 2*b*, and hence diode 19 cannot conduct to effect the charging of condenser 7 during this period. The net result of condenser 7 being charged between the grid and anode of pentode 8 during the leading-edge portion of the triangular waveform applied to its grid 13, is that a voltage wave is developed at the anode 9** whose leading edge has an amplitude corresponding to the integral of the applied waveform. In the present instance, a parabolic wave is developed as shown in Fig. 2*e*.

Difficulty is experienced with the fundamental Miller integrator circuit in attempting to derive a plurality of waves having a steep inflection in their waveform, such as at 26 of Fig. 2*e*. This stems from the fact that in considering a train of applied waves, such as the triangular waves of Fig. 2*b*, a conventional integrating circuit would continuously integrate all of the waves in a train relative to some average, overall waveform amplitude level. Actually what is required is, that integration be performed separately for each applied triangular wave relative to its initial amplitude level, which in the present instance is the starting level, 27, of its leading negative-going edge. This is accomplished, according to the present invention, by halting the integration of each applied wave at the end of its leading edge portion, and then returning the amplitude of the integrated wave to its initial level, corresponding to the start of the leading edge portion. This integration, halting of integration, and returning of the amplitude to some predetermined level is carried on separately for each wave in the train.

In the embodiment of Fig. 3, the steps outlined above are carried out as follows. Diode 19 connected across resistor 6 helps to prevent complete integration during the time between applied triangular waves by conducting during the negative-going trailing edge 31 of the wave form of Fig. 2*b* applied to the grid 13. Conduction occurs because the cathode of diode 19 goes negative relative to its anode at this time. Conduction of diode 19 provides a lower impedance path around the input resistor 6 which helps to discharge condenser 7 more rapidly, and hence, also, return the amplitude of the parabolic wave of Fig. 2*e* towards its initial amplitude level. The effective reduction of the resistance of 6, caused by diode 19 conducting, amounts to an increase in the coefficient of integration of the overall integrating circuit. It is obvious, however, that some undesirable integration would still continue to take place during the time between successive triangular waves. To insure that integration only takes place during the interval that a triangular wave appears at the output impedance of cathode follower 3, and that the amplitude of the integrated wave is thereupon substantially instantaneously returned to its initial level, applicant provides a parallel circuit arrangement, comprising inductance 23 and diode 24, connected between the anode 9 and ground. Diode 24, with its cathode 29 connected through condenser 25 to the anode 9 and its anode 30 connected to ground, is non-conductive during the time the voltage of Fig. 2*e* is rising in a positive direction at anode 9. However, after the inflection point 26, the previously rising current wave, in inductance 23 suddenly tends to fall, facilitated by the conduction of diode 19, thereby inducing a large back voltage across inductance 23 of such polarity as to cause appreciable discharge current flow through the capacitor 7, and the path comprising capacitor 25, inductance 23, output impedance of cathode follower 3, and diode 19, to supplement the capacitor discharge current flowing through the paths comprising pentode 8, output impedance of cathode follower 3, and diode 19 and the path comprising resistor 10, the B+ supply to ground, source 3, and diode 19. The over-all result is that the trailing edge, 28, of the parabolic wave follows the solid line form shown in Fig. 2*e*.

During the accelerated recovery of the integrator in Fig. 3 due to the presence of inductance 23, it is possible that the output voltage on 21 may change in polarity relative to its value at the start of integration as shown by the dotted line 32 in Fig. 2*e*. To prevent this eventuality, diode 24 is introduced, so polarized as to short circuit any overshoot during recovery. The diode 24 is normally non-conductive during generation of the leading edge of the parabolic waveform. However, it is adapted to respond to any negative-going potential below that required to return the parabolic wave to its initial value, induced between its cathode 29 and anode 30 by inductance 23 during the accelerated discharge of condenser 7, to become conductive. Upon conduction, diode 24 prevents the potential at its cathode 29 and hence also at anode 9 from swinging any farther in the negative-going direction with the result that solid waveform of Fig. 2*e* is obtained at the output lead 5 of integrator 4.

It is obvious that the arrangement of Fig. 3 will operate in a manner similar to that already described to integrate the applied squares of Fig. 2*a* and provide the triangular waves of Fig. 2*b*.

While particular embodiments of the present invention have been shown and described, it will be obvious to those skilled in the art that changes and modifications may be made without departing from this invention in its broader aspects and therefore the aim in the appended claims is to cover all such changes and modifications as fall within the true spirit and scope of the invention.

What I claim as new and desire to secure by Letters Patent of the United States is:

1. An arrangement comprising a source of first waves, a charging circuit for integrating said first waves to derive second waves, said charging circuit having an instantaneous charge corresponding to the continuous integral of said first waves, and means responsive to a predetermined rate of change of current flow in said charging circuit to instantaneously discharge said circuit to a given level, said means comprising a unilaterally conducting device connected in parallel with an inductive element.

2. In combination, an electron discharge device comprising a pair of electrodes, means for energizing said device with a first electrical wave to alter the current flow in said device, a condenser connected between said electrodes and responsive to said altered current flow for acquiring a corresponding electrical charge, a circuit comprising a unilaterally conducting device connected in parallel with an inductance, said inductance responsive to a given rate of change of discharge current flow through said condenser for inducing a voltage of sufficient amplitude and appropriate polarity to substantially instantaneously discharge said condenser.

3. In combination, an integrating circuit comprising an electron discharge device, said device comprising an anode, cathode and a control grid, a charging condenser connected between said anode and grid, an input resistor connected to said grid, said electron discharge device adapted to respond to a voltage applied through said input resistor to its control grid for generating a voltage at its anode corresponding to the integral of the applied voltage, an inductance connected between said anode and said cathode, a first normally non-conductive diode connected across said inductance, a second normally non-conductive diode connected across said input resistor, said second diode responsive to an inflection in the waveform of said applied voltage to become conductive and cause a predetermined rate of change of current flow at said anode, said inductance responsive to said predetermined rate of change of current flow for inducing a voltage of sufficient amplitude and appropriate polarity to substantially instantaneously discharge said condenser, said first diode responsive to a change in polarity of said induced voltage to become conductive and limit the magnitude of said induced voltage.

4. In combination, an integrating circuit comprising a pentode electron discharge device, said device comprising an anode, cathode and a control grid, a charging condenser connected between said anode and grid, an input resistor connected to said grid, a first normally non-conductive, unilaterally conducting device connected across said resistor, a load resistor, a source of unidirectional potential connected to said cathode and through said load resistor to said anode, said electron discharge device adapted to respond to a voltage applied through said input resistor to its control grid for generating a voltage at its anode corresponding to the integral of the applied voltage, said device adapted to respond to an inflection in the applied voltage to reduce the voltage at said anode, an inductance connected between said anode and said cathode, a second normally non-conductive unilaterally conducting device connected in parallel with said inductance, said inductance responsive to said reduction in voltage for inducing a voltage of sufficient amplitude and appropriate polarity to render said second unilaterally conducting device conductive.

5. A self-resetting integrating circuit comprising, a charging condenser connected as an integrating element in an amplifier circuit; an inductance connected to be responsive to a given rate of change in a given direction of the charge on said condenser for inducing a voltage, and means responsive to said induced voltage for increasing said rate of change in said given direction.

References Cited in the file of this patent

UNITED STATES PATENTS

| | | |
|---|---|---|
| 2,460,601 | Schade | Feb. 1, 1949 |
| 2,485,608 | Keim | Oct. 25, 1949 |
| 2,584,882 | Johnson | Feb. 5, 1952 |
| 2,594,104 | Washburn | Apr. 22, 1952 |
| 2,621,292 | White | Dec. 9, 1952 |
| 2,675,469 | Harker et al. | Apr. 13, 1954 |
| 2,735,007 | McCurdy | Feb. 14, 1956 |